United States Patent
Hsu et al.

(10) Patent No.: US 12,223,151 B2
(45) Date of Patent: Feb. 11, 2025

(54) CIRCUIT CARRIER

(71) Applicant: PIXART IMAGING INC., Hsin-Chu (TW)

(72) Inventors: Che-Chia Hsu, Hsin-Chu (TW); Chun-Lin Tseng, Hsin-Chu (TW); Yu-Han Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/640,087

(22) Filed: Apr. 19, 2024

(65) Prior Publication Data
US 2024/0288976 A1    Aug. 29, 2024

Related U.S. Application Data

(63) Continuation of application No. 18/215,559, filed on Jun. 28, 2023, now Pat. No. 12,008,205.

(60) Provisional application No. 63/448,645, filed on Feb. 27, 2023.

(51) Int. Cl.
*G06F 3/044*    (2006.01)

(52) U.S. Cl.
CPC .. *G06F 3/0446* (2019.05); *G06F 2203/04111* (2013.01)

(58) Field of Classification Search
None
See application file for complete search history.

(56) References Cited

U.S. PATENT DOCUMENTS 9,075,484 B2 *   7/2015   Ritter ................. G06F 3/0446

\* cited by examiner

*Primary Examiner* — Christopher J Kohlman
(74) *Attorney, Agent, or Firm* — Li & Cai Intellectual Property (USA) Office

(57) ABSTRACT

A circuit carrier includes a substrate, a capacitive electrode layer, a plurality of metal pads and a plurality of bridges, and a plurality of conductive pillars. The capacitive electrode layer formed on a surface of the substrate and includes a plurality of first electrodes and a plurality of second electrodes. At least two of the first electrodes are connected to each other and be arranged across a die-bonding region of the substrate for separating at least two of the second electrodes that partially protrude from the die-bonding region to respectively form extensions. The metal pads and the bridges are formed on another surface of the substrate and are located outside of the die-bonding region. Each of the bridges connects two of the metal pads, and each of the conductive pillars is embedded in the substrate and connects one of the extensions and a corresponding one of metal pads.

15 Claims, 11 Drawing Sheets

CIRCUIT CARRIER

CROSS-REFERENCE TO RELATED PATENT APPLICATION

This application is a continuation application of the U.S. patent application Ser. No. 18/215,559 field on Jun. 28, 2023, and entitled "CIRCUIT CARRIER." The entirety of the above-mentioned patent application is hereby incorporated by reference herein and made as a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a circuit carrier, and more particularly to a circuit carrier having a capacitive electrode layer.

BACKGROUND OF THE DISCLOSURE

A conventional circuit carrier has metal pads and connection bridges formed on a region thereof that is defined for mounting of a chip. As a result, a circuit layout of the conventional circuit carrier and a structural design of the chip may affect each other.

SUMMARY OF THE DISCLOSURE

In response to the above-referenced technical inadequacies, the present disclosure provides a circuit carrier for effectively improving on the issues associated with conventional circuit carriers.

In one aspect, the present disclosure provides a circuit carrier, which includes a substrate, a capacitive electrode layer, a plurality of metal pads, a plurality of bridges, and a plurality of conductive pillars. The substrate has a die-bonding region and a peripheral region that surrounds the die-bonding region. Moreover, outer surfaces of the substrate include a layout surface and a carrying surface that is opposite to the layout surface. The capacitive electrode layer is formed on the layout surface and includes a plurality of first electrodes and a plurality of second electrodes. The first electrodes are arranged in multiple columns each parallel to a first direction. Specifically, M number of the first electrodes are connected along the first direction so as to be arranged across the die-bonding region and are each defined as a first layout electrode, where M is a positive integer being greater than one. The second electrodes are arranged in multiple rows each parallel to a second direction perpendicular to the first direction. Specifically, N number of the second electrodes are separate from each other along the second direction by the M number of the first layout electrodes and are each defined as a second layout electrode, where N is a positive integer being greater than one. A portion of each of the second layout electrodes protrudes from the die-bonding region to form at least one extension disposed on the peripheral region. The metal pads are formed on the carrying surface and are disposed on the peripheral region. Any one of the extensions of the N number of the second layout electrodes corresponds in position to one of the metal pads along a thickness direction that is perpendicular to the first direction and the second direction. The bridges are formed on the carrying surface and are disposed on the peripheral region. Any one of the bridges connects two of the metal pads. The conductive pillars are embedded in the peripheral region. Two ends of any one of the conductive pillars are respectively connected to one of the extensions and the corresponding metal pad.

In certain embodiments, the N number of the second layout electrodes have at least two different shapes through formation of the extensions.

In certain embodiments, any one of the extensions of the N number of the second layout electrodes is arranged adjacent to one of the first electrode that has a slot facing toward the corresponding extension adjacent thereto.

In certain embodiments, one of the two ends of any one of the conductive pillars connected to the corresponding one of the extensions is surrounded by one of the slots.

In certain embodiments, any one of the slots is formed in one of the first layout electrodes, and the M number of the first layout electrodes have at least two different shapes through formation of the slots.

In certain embodiments, the first electrodes are spaced apart from each other along the second direction, and the second electrodes are spaced apart from each other along the first direction.

In certain embodiments, any one of the first electrodes other than the M number of the first layout electrodes has a shape different from that of each of the first layout electrodes. Moreover, any one of the second electrodes other than the N number of the second layout electrodes has a shape different from that of each of the second layout electrodes.

In certain embodiments, each of the first electrodes is defined as a driving electrode (TX), and each of the second electrodes is defined as a sensing electrode (RX).

In another aspect, the present disclosure provides a circuit carrier, which includes a substrate, a capacitive electrode layer, a plurality of metal pads, a plurality of bridges, and a plurality of conductive pillars. The substrate has a die-bonding region and a peripheral region that surrounds the die-bonding region. Moreover, outer surfaces of the substrate include a layout surface and a carrying surface that is opposite to the layout surface. The die-bonding region has a predetermined length along a first direction and a predetermined width along a second direction perpendicular to the first direction. The capacitive electrode layer is formed on the layout surface and includes a plurality of first electrodes, a plurality of second electrodes spaced apart from the first electrodes, and a plurality of first connection segments. Any one of the first connection segments connects two of the first electrodes, so that the first electrodes and the first connection segments jointly forms a plurality of first layout patterns spaced apart from each other. Any one of the first layout patterns disposed on the die-bonding region has a layout length along the first direction and a layout width along the second direction, and includes at least one protrusion disposed on the peripheral region through the layout length being greater than the predetermined length or the layout width being greater than the predetermined width. The metal pads are formed on the carrying surface and are disposed on the peripheral region. Any one of the protrusions of the first layout patterns corresponds in position to one of the metal pads along a thickness direction that is perpendicular to the first direction and the second direction. The bridges are formed on the carrying surface and are disposed on the peripheral region. Any one of the bridges connects two of the metal pads. The conductive pillars are embedded in the peripheral region. Two ends of any one of the conductive pillars are respectively connected to one of the protrusions and the corresponding metal pad.

In certain embodiments, the capacitive electrode layer includes a plurality of second connection segments. Any one of the second connection segments connects two of the second electrodes, so that the second electrodes and the second connection segments jointly forms a plurality of second layout patterns spaced apart from each other along the first direction.

In certain embodiments, any two of the second layout patterns adjacent to each other are provided with at least two of the first layout patterns therebetween arranged in one row along the second direction.

In certain embodiments, each of the second layout patterns includes a main chain structure having N number of the second electrodes arranged in one row along the second direction and the corresponding second connection segments connected thereto, where N is a positive integer being greater than one.

In certain embodiments, each of the second layout patterns further includes a plurality of branched chain structures each having at least two of the second electrodes and the corresponding second connection segment connected thereto. Each of the branched chain structures is connected to one side of the main chain structure through one of the second connection segments thereof.

In certain embodiments, in each of the second layout patterns, a quantity of the second electrodes of the branched chain structures is equal to a quantity of the second electrodes of the main chain structures.

In certain embodiments, the main chain structures of any two of the second layout patterns adjacent to each other are provided with at least two of the first layout patterns therebetween that are arranged in one row along the second direction and that are shaped to surround the at least two second electrodes of one of the branched chains structures in the any two of the second layout patterns.

In certain embodiments, the first layout patterns arranged in one column along the first direction are separate from each other by the second layout patterns and are electrically coupled to each other through the metal pads, the bridges, and the conductive pillars.

In certain embodiments, the first electrode and the second electrodes are staggeredly arranged in a regular manner.

In yet another aspect, the present disclosure provides a circuit carrier, which includes a substrate, a capacitive electrode layer, two metal pads, two extending circuits, and two conductive pillars. The substrate has a die-bonding region and a peripheral region that surrounds the die-bonding region. Moreover, outer surfaces of the substrate include a layout surface and a carrying surface that is opposite to the layout surface. The die-bonding region includes a plurality of connection pads arranged on the carrying surface for allowing a chip to be mounted thereon, so that two of the connection pads are configured to be electrically coupled to each other through an internal circuit of the chip and are each defined as a layout connection pad. The capacitive electrode layer is formed on the layout surface. The two metal pads are formed on the carrying surface. The two extending circuits are formed on the carrying surface. The two metal pads are respectively connected to the two layout connection pads through the two extending circuits. The two conductive pillars are embedded in the substrate. Two ends of any one of the two conductive pillars are respectively connected to the capacitive electrode layer and one of the two metal pads.

In certain embodiments, the two metal pads are disposed on the die-bonding region.

In certain embodiments, the two metal pads are disposed on the peripheral region.

Therefore, in the circuit carrier provided by the present disclosure, through the structural design of the capacitive electrode layer (e.g., the structural cooperation of the M number of the first layout electrodes and the N number of the second layout electrodes, or the structural design of the first layout patterns), the metal pads, the bridges, and the conductive pillars can be arranged in the peripheral region for effectively preventing a circuit layout of the circuit carrier and a structural design of the chip from affecting each other.

Moreover, the circuit carrier provided by the present disclosure can cooperate with the internal circuit of the chip through the two layout connection pads so as to omit the bridge that connects the two metal pads, thereby effectively preventing the circuit layout of the circuit carrier and the structural design of the chip from affecting each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
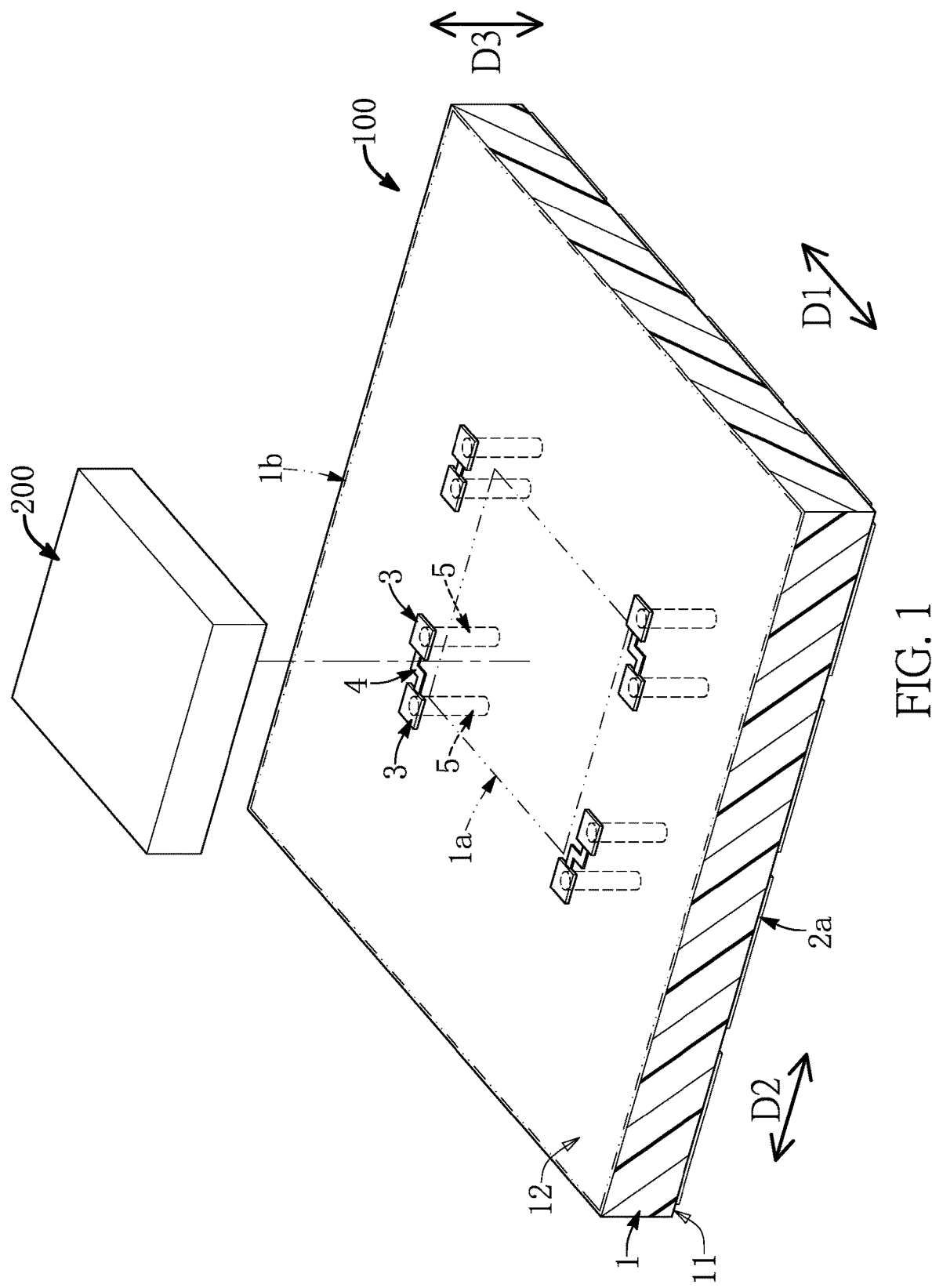
FIG. 1 is a schematic perspective view of a circuit carrier and a chip according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
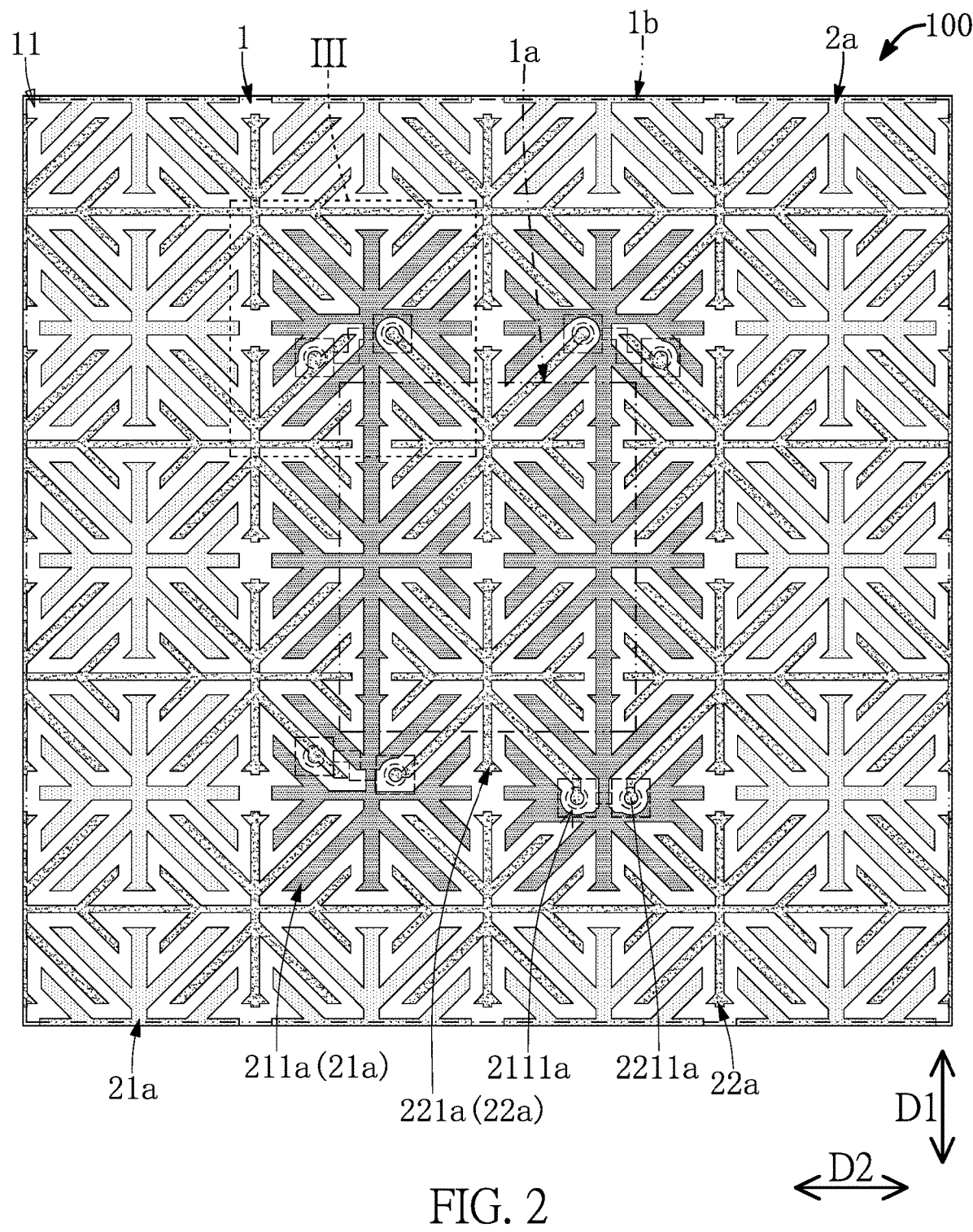
FIG. 2 is a schematic bottom view of the circuit carrier of FIG. 1.
Figure 3:
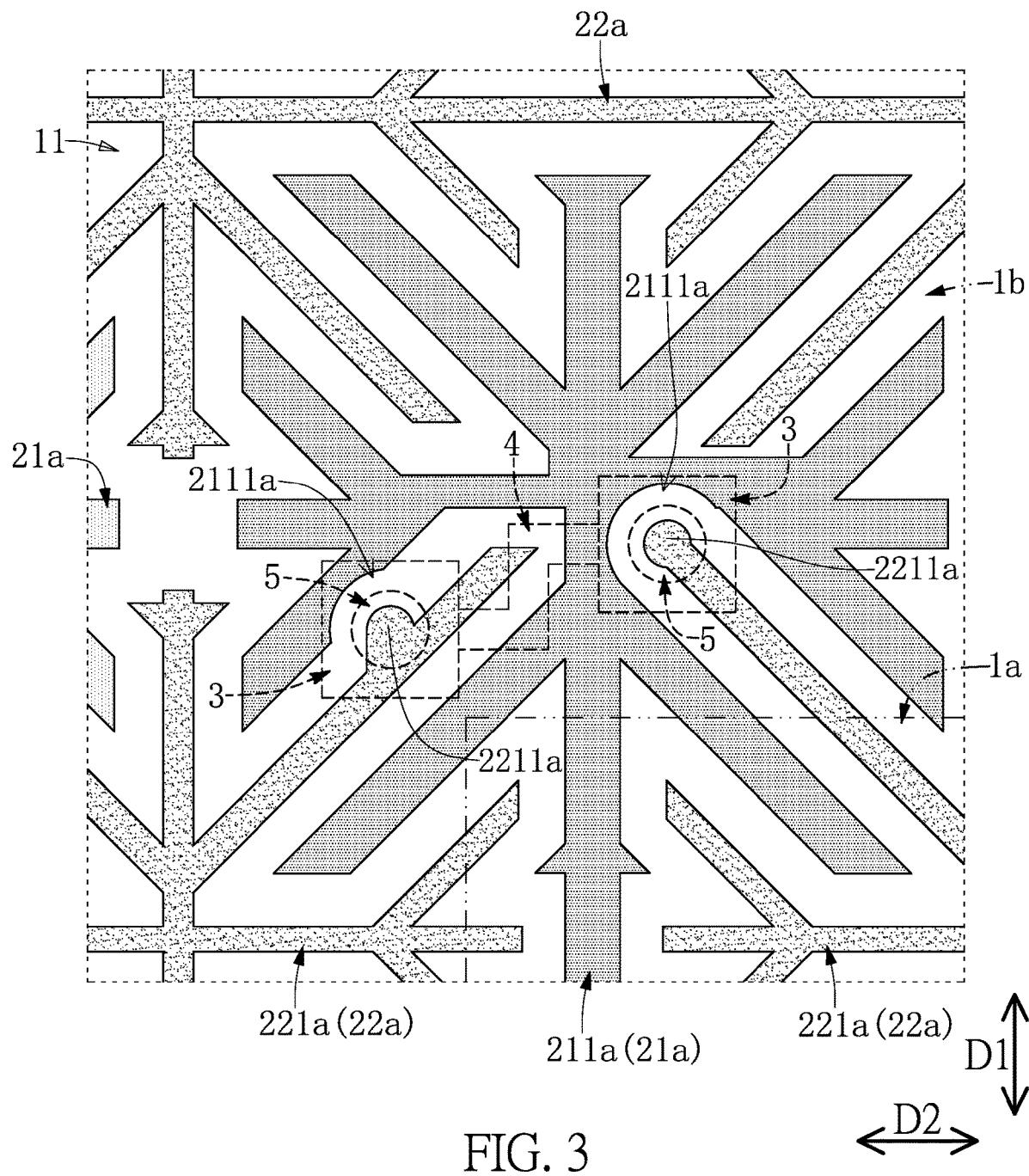
FIG. 3 is a schematic enlarged view of part III of FIG. 2.

Referring to FIG. 1 to FIG. 3, a first embodiment of the present disclosure provides a circuit carrier 100, which includes a substrate 1, a capacitive electrode layer 2a, a plurality of metal pads 3, a plurality of bridges 4, and a plurality of conductive pillars 5. The capacitive electrode layer 2a is formed on one side of the substrate 1, the metal pads 3 and the bridges 4 are formed on another side of the substrate 1, and the conductive pillars 5 are embedded in the substrate 1. It should be noted that in order to clearly describe the present embodiment, the drawings only show a part of the circuit carrier 100 for ease of illustration.

The substrate 1 in the present embodiment can be a printed circuit board (PCB), but the present disclosure is not limited thereto. The substrate 1 has a die-bonding region 1a and a peripheral region 1b that surrounds the die-bonding region 1a, and outer surfaces of the substrate 1 include a layout surface 11 (e.g., a bottom surface of the substrate 1 shown in FIG. 1) and a carrying surface 12 (e.g., a top surface of the substrate 1 shown in FIG. 1) that is opposite to the layout surface 11.

The carrying surface 12 arranged on the die-bonding region 1a of the substrate 1 allows a chip 200 (e.g., a touch-control chip) to be mounted thereon. In other words, the carrying surface 12 of the substrate 1 is provided for allowing the chip 200 to be mounted thereon, and a projection region of the substrate 1 defined by orthogonally projecting the chip 200 toward the layout surface 11 is defined as the die-bonding region 1a.

The capacitive electrode layer 2a is formed on the layout surface 11, and the capacitive electrode layer 2a includes a plurality of first electrodes 21a arranged in multiple columns and a plurality of second electrodes 22a that are arranged in multiple rows. Each of the columns of the first electrodes 21a is parallel to a first direction D1, and each of the rows of the second electrodes 22a is parallel to a second direction D2 perpendicular to the first direction D1. Specifically, the first electrodes 21a are spaced apart from each other along the second direction D2, and the second electrodes 22a are spaced apart from each other along the first direction D1.

In the present embodiment, each of the first electrodes 21a is defined as a driving electrode (TX), and each of the second electrodes 22a is defined as a sensing electrode (RX), but the present disclosure is not limited thereto. For example, in other embodiments of the present disclosure not shown in the drawings, each of the first electrodes 21a can be a sensing electrode, and each of the second electrodes 22a can be a driving electrode.

Specifically, M number of the first electrodes 21a are connected along the first direction D1 so as to be arranged across the die-bonding region 1a and are each defined as a first layout electrode 211a, where M is a positive integer being greater than one. In the present embodiment, M is six, the M number of the first layout electrodes 211a are arranged in two columns that are spaced apart from each other, and the first layout electrodes 211a in each of the two columns are connected sequentially. The first electrodes 21a other than the M number of the first layout electrodes 211a are located on the peripheral region 1b, and can be directly connected to each other on the layout surface 11 or can be indirectly connected to each other through other components.

Moreover, N number of the second electrodes 22a are separate from each other along the second direction D2 by the M number of the first layout electrodes 211a and are each defined as a second layout electrode 221a, where N is a positive integer being greater than one. In the present embodiment, N is six, the N number of the second layout electrodes 221a are arranged in two rows, and the second layout electrodes 221a are not in contact with each other on the layout surface 11. The second electrodes 22a other than the N number of the second layout electrodes 221a are located on the peripheral region 1b, and can be directly connected to each other on the layout surface 11 or can be indirectly connected to each other through other components.

Moreover, a portion of each of the second layout electrodes 221a protrudes from the die-bonding region 1a to form at least one extension 2211a that is disposed on the peripheral region 1b. In other words, the at least one extension 2211a of each of the second layout electrodes 221a is arranged away from the die-bonding region 1a and is surrounded by an adjacent one of the first layout electrodes 211a. In the present embodiment, for three of the second layout electrodes 221a arranged adjacent to each other and arranged in one row, a center one of the three second layout electrodes 221a has two of the extensions 2211a respectively arranged adjacent to another two of the extensions 2211a that are respectively provided by another two of the three second layout electrodes 221a.

Specifically, the N number of the second layout electrodes 221a can have at least two different shapes through formation of the extensions 2211a. For example, the N number of the second layout electrodes 221a in the present embodiment can have at most N number of different shapes. Moreover, the second electrodes 22a other than the N number of the second layout electrodes 221a can have a same shape that is different from a shape of any one of the second layout electrodes 221a.

In addition, the extension 2211a of each of the N number of the second layout electrodes 221a is arranged adjacent to one of the first electrodes 21a that has a slot 2111a facing toward the corresponding extension 2211a adjacent thereto. In the present embodiment, any one of the slots 2211a is formed in one of the first layout electrodes 211a. For three of the first layout electrodes 211a connected in one column, a center one of the three first layout electrodes 211a does not have any one of the slots 2111a, and another two of the three first layout electrodes 211a each have two of the slots 2111a, but the present disclosure is not limited thereto. In other words, for the first layout electrodes 211a connected in one column, the slots 2211a are formed on the outer two of the first layout electrodes 211a.

Specifically, the M number of the first layout electrodes 211a can have at least two different shapes through formation of the slots 2111a. For example, the M number of the first layout electrodes 211a in the present embodiment can have at most M number of different shapes. Moreover, the first electrodes 21a other than the M number of the first layout electrodes 211a can have a same shape that is different from a shape of any one of the first layout electrodes 211a.

Furthermore, the slots 2111a of the M number of the first layout electrodes 211a and the extensions 2211a of the N number of the second layout electrodes 221a in the present embodiment are respectively arranged adjacent to corners of the die-bonding region 1a and are located outside of the corners of the die-bonding region 1a.

The metal pads 3 and the bridges 4 are formed on the carrying surface 12 and are located on the peripheral region 1b. Each of the extensions 2211a corresponds in position to one of the metal pads 3 along a thickness direction D3 that is perpendicular to the first direction D1 and the second direction D2. Each of the bridges 4 connects two of the metal pads 3 respectively corresponding in position to two of the extensions 2211a that respectively belong to two of the second layout electrodes 221a.

The conductive pillars 5 are embedded in the peripheral region 1b, and two ends of any one of the conductive pillars 5 are respectively connected to one of the extensions 2211a and the corresponding metal pad 3. Moreover, one of the two ends of any one of the conductive pillars 5 connected to the corresponding extension 2211a is preferably surrounded by one of the slots 2111a, thereby effectively avoiding contact with the first layout electrode 211a that has the one of the slots 2111a.

In summary, in the circuit carrier 100 of the present embodiment, through the structural cooperation of the M number of the first layout electrodes 211a and the N number of the second layout electrodes 221a in the capacitive electrode layer 2a, the metal pads 3, the bridges 4, and the conductive pillars 5 can be arranged in the peripheral region 1b for effectively preventing a circuit layout of the circuit carrier 100 and a structural design of the chip 200 from affecting each other.

In other words, the second electrodes 22a of any one of the rows arranged on the peripheral region 1b are connected along the second direction D2, and the second electrodes 22a of any one of the rows arranged on the die-bonding region 1a are not connected along the second direction D2. Specifically, a quantity of the rows arranged on the die-bonding region 1a is only two, thereby enabling each of the second electrodes 22a of the two rows to form the at least one extension 2211a by extending out of the die-bonding region 1a.

Moreover, the first electrodes 21a of any one of the columns arranged on the peripheral region 1b are not connected along the first direction D1, and the first electrodes 21a of any one of the columns arranged on the die-bonding region 1a are connected along the first direction D1. Specifically, a quantity of the first electrodes 21a of any one of the columns arranged on the die-bonding region 1a can be adjusted according to design requirements and is not limited by the present embodiment.

Second Embodiment

Figure 4:
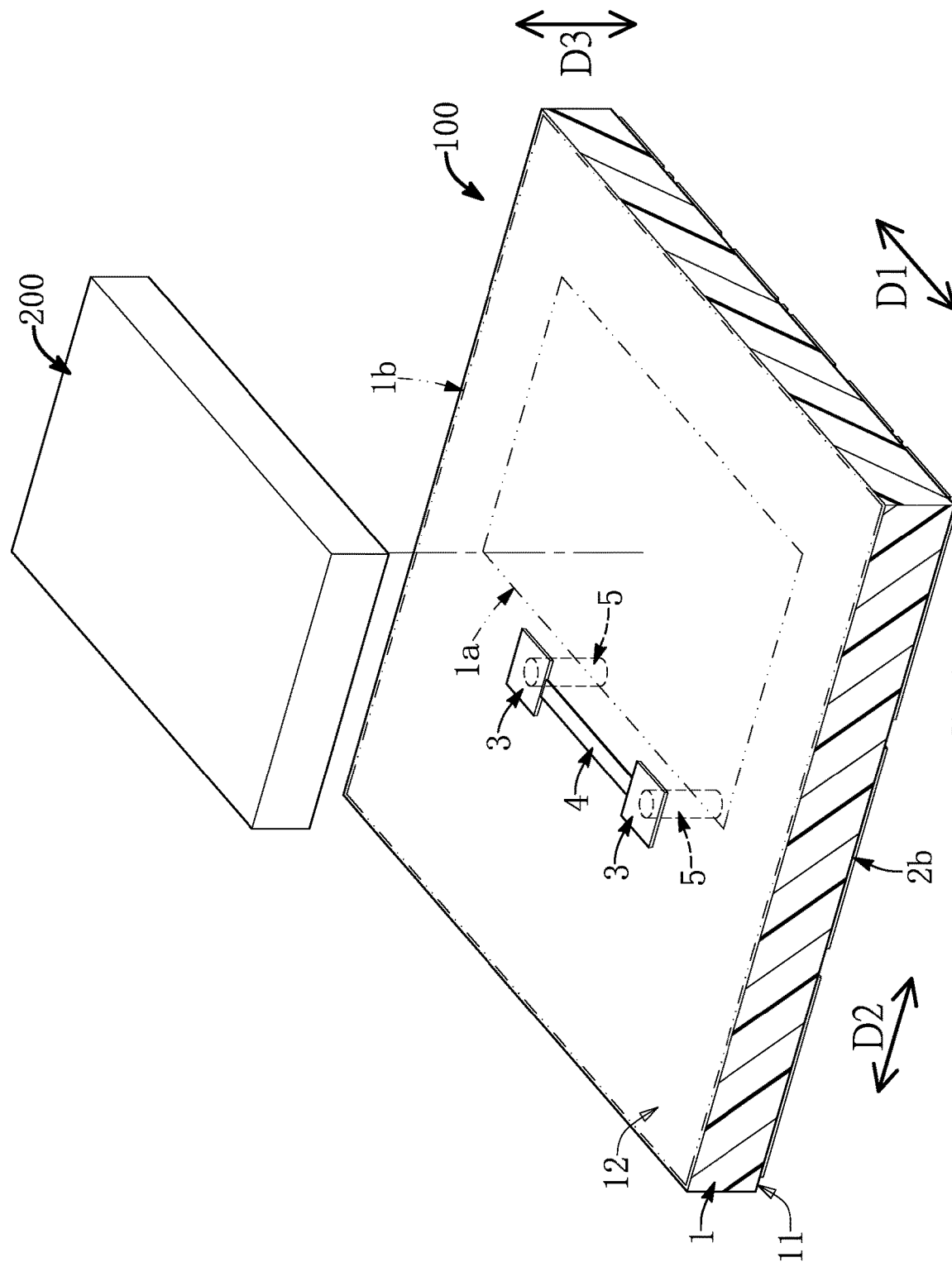
FIG. 4 is a schematic perspective view of the circuit carrier and the chip according to a second embodiment of the present disclosure.
Figure 5:
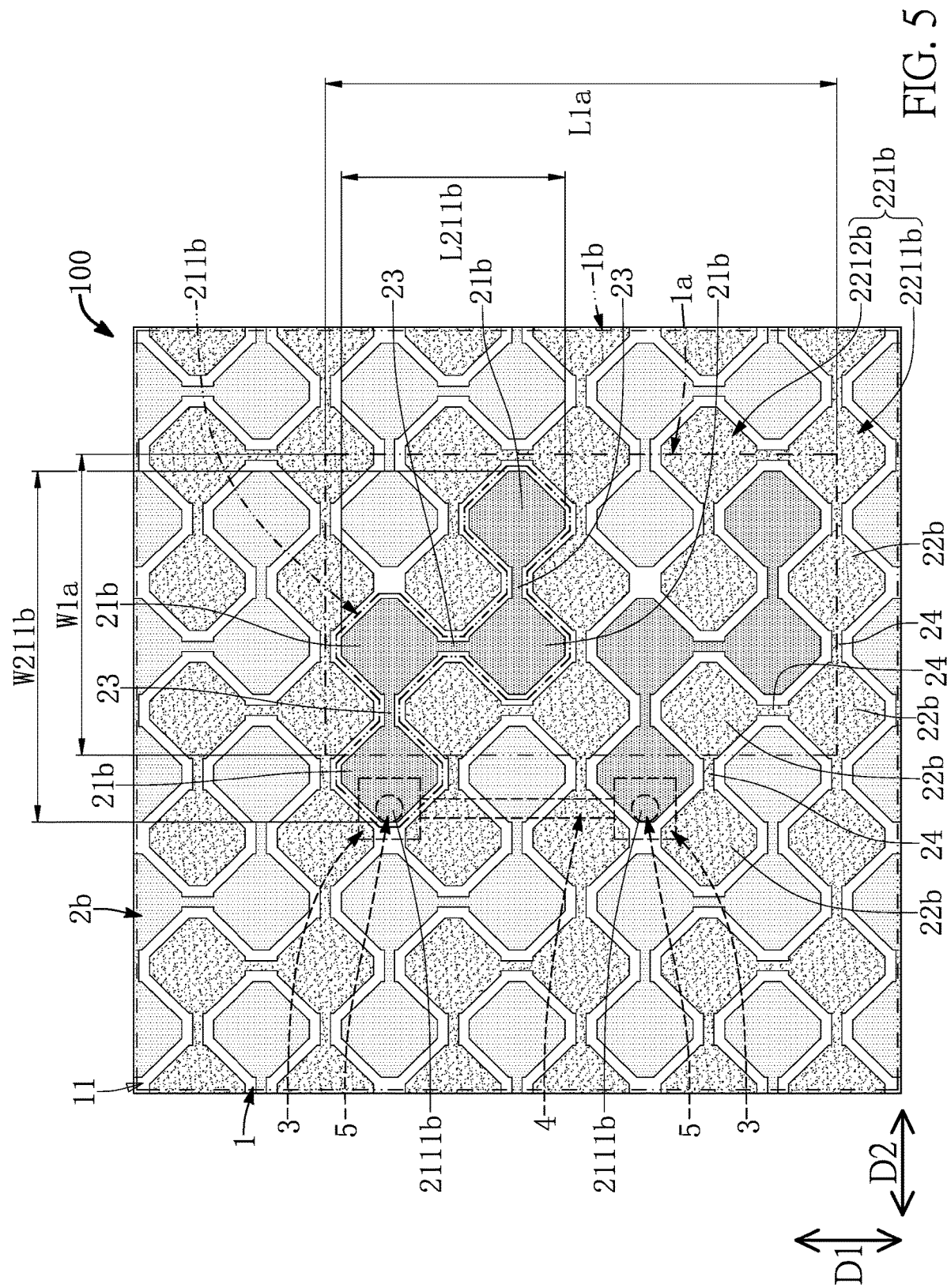
FIG. 5 is a schematic bottom view of the circuit carrier of FIG. 4.

Referring to FIG. 4 and FIG. 5, a second embodiment of the present disclosure provides a circuit carrier 100, which includes a substrate 1, a capacitive electrode layer 2b, a plurality of metal pads 3, a plurality of bridges 4, and a plurality of conductive pillars 5. The capacitive electrode layer 2b is formed on one side of the substrate 1, the metal pads 3 and the bridges 4 are formed on another side of the substrate 1, and the conductive pillars 5 are embedded in the substrate 1. It should be noted that in order to clearly describe the present embodiment, the drawings only show a part of the circuit carrier 100 for ease of discussion.

The substrate 1 in the present embodiment can be a PCB, but the present disclosure is not limited thereto. The substrate 1 has a die-bonding region 1a and a peripheral region 1b that surrounds the die-bonding region 1a, and outer surfaces of the substrate 1 include a layout surface 11 (e.g., a bottom surface of the substrate 1 shown in FIG. 4) and a carrying surface 12 (e.g., a top surface of the substrate 1 shown in FIG. 4) that is opposite to the layout surface 11.

The carrying surface 12 arranged on the die-bonding region 1a of the substrate 1 allows a chip 200 (e.g., a touch-control chip) to be mounted thereon. In other words, the carrying surface 12 of the substrate 1 is provided for the chip 200 to be mounted thereon, and a projection region of the substrate 1 defined by orthogonally projecting the chip 200 toward the layout surface 11 is defined as the die-bonding region 1a. Moreover, the die-bonding region 1a has a predetermined length L1a along a first direction D1 and a predetermined width W1a along a second direction D2 perpendicular to the first direction D1.

The capacitive electrode layer 2b is formed on the layout surface 11, and the capacitive electrode layer 2b includes a plurality of first electrodes 21b, a plurality of second electrodes 22b, a plurality of first connection segments 23 that connect the first electrodes 21b, and a plurality of second connection segments 24 that connect the second electrodes 22b, but the present disclosure is not limited thereto. For example, in other embodiments of the present disclosure not shown in the drawings, the second connection segments 24 can be omitted or can be replaced by other components according to design requirements.

The first electrodes 21b and the second electrodes 22b are spaced apart from each other, and the first electrodes 21b and the second electrodes 22b in the present embodiment are in a staggered and regular arrangement (or are staggeredly arranged in a regular manner). For example, the first electrodes 21b are in a matrix arrangement along the first direction D1 and the second direction D2, and the second electrodes 22b are in another matrix arrangement along the first direction D1 and the second direction D2. Along a slanting direction that has an angle of 45 degrees with respect to the first direction D1, any two of the first electrodes 21b adjacent to each other are provided with one of the second electrodes 22b therebetween. In addition, the first electrodes 21b and the second electrodes 22b in the present embodiment each have a substantially rhombic shape, but the present disclosure is not limited thereto.

Each of the first connection segments 23 connects two of the first electrodes 21b (adjacent to each other), so that the first electrodes 21b and the first connection segments 23 jointly forms a plurality of first layout patterns 211b spaced apart from each other. In the present embodiment, any one of the first connection segments 23 has an elongated shape being parallel to the first direction D1 or the second direction D2, and each of the first connection segments 23 is connected to two corners that respectively belong to the corresponding two first electrodes 21b and that are arranged adjacent to each other, but the present disclosure is not limited thereto.

Specifically, any one of the first layout patterns 211b disposed on the die-bonding region 1a has a layout length L211b along the first direction D1 and a layout width W211b along the second direction D2, and includes at least one protrusion 2111b disposed on the peripheral region 1b through the layout length L211b being greater than the predetermined length L1a or the layout width W211b being greater than the predetermined width W1a. In the present embodiment, any one of the first layout patterns 211b disposed on the die-bonding region 1a has one of the protrusions 2111b arranged adjacent to the die-bonding region 1a through the layout width W211b being greater than the predetermined width W1a, but the present disclosure is not limited thereto.

In addition, as the first layout patterns 211b in the present embodiment substantially have the same shape, the following description discloses the shape of just one of the first layout patterns 211b for the sake of brevity, but the present disclosure is not limited thereto. For example, in other embodiments of the present disclosure not shown in the drawings, the first layout patterns 211b can have different shapes.

Specifically, the first layout pattern 211b in the present embodiment includes four of the first electrodes 21b and three of the first connection segments 23. Moreover, in the first layout pattern 211b, two of the four first electrodes 21b are connected to each other along the first direction D1 through one of the three first connection segments 23, and are respectively connected to another two of the four first electrodes 21b (which are located at two opposite sides of the two of the four first electrodes 21b), along the second direction D2 through another two of the three first connection segments 23, but the present disclosure is not limited thereto.

Each of the second connection segments 24 connects two of the second electrodes 22b (adjacent to each other), so that the second electrodes 22b and the second connection segments 24 jointly forms a plurality of second layout patterns 221b spaced apart from each other along the first direction D1. In the present embodiment, any one of the second connection segments 24 has an elongated shape being parallel to the first direction D1 or the second direction D2, and each of the second connection segments 24 is connected to two corners that respectively belong to the corresponding two second electrodes 22b and that are arranged adjacent to each other, but the present disclosure is not limited thereto.

As the second layout patterns 221b in the present embodiment substantially have the same shape, the following description discloses the shape of just one of the second layout patterns 221b for the sake of brevity, but the present disclosure is not limited thereto. For example, in other embodiments of the present disclosure not shown in the drawings, the second layout patterns 221b can have different shapes.

Specifically, the second layout pattern 221b in the present embodiment includes a main chain structure 2211b and a plurality of branched chain structures 2212b that are connected to one side of the main chain structure 2211b (e.g., an upper side of the main chain structure 2211b shown in FIG. 5). The main chain structure 2211b has N number of the second electrodes 22b arranged in one row along the second direction D2 and the corresponding second connection segments 24 connected thereto, where N is a positive integer greater than one. Moreover, each of the branched chain structures 2212b is connected to the upper side of the main chain structure 2211b through one of the second connection segments 24 thereof, and each of the branched chain structures 2212b includes at least two of the second electrodes 22b and the corresponding second connection segment 24 connected thereto.

In addition, in the second layout patterns 221b provided by the present embodiment, a quantity of the second electrodes 22b of the branched chain structures 2212b is equal to a quantity of the second electrodes 22b of the main chain structures 2211b.

Moreover, any two of the second layout patterns 221b adjacent to each other are provided with at least two of the first layout patterns 211b therebetween arranged in one row along the second direction D2. Specifically, the main chain structures 2211b of any two of the second layout patterns 221b adjacent to each other are provided with at least two of the first layout patterns 211b therebetween that are arranged in one row along the second direction D2 and that are shaped to surround the at least two second electrodes 22b of one of the branched chains structures 2212b in the any two of the second layout patterns 221b.

The metal pads 3 and the bridges 4 are formed on the carrying surface 12 and are located on the peripheral region 1b. Each of the protrusions 2111b corresponds in position to one of the metal pads 3 along a thickness direction D3 that is perpendicular to the first direction D1 and the second direction D2. Each of the bridges 4 connects two of the metal pads 3 respectively corresponding in position to two of the protrusions 2111b that respectively belong to two of the first layout patterns 211b.

The conductive pillars 5 are embedded in the peripheral region 1b, and two ends of any one of the conductive pillars 5 are respectively connected to one of the protrusions 2111b and the corresponding metal pad 3. In other words, the first layout patterns 21b arranged in one column along the first direction D1 are separate from each other by the second layout patterns 221b and are electrically coupled to each other through the metal pads 3, the bridges 4, and the conductive pillars 5.

In summary, in the circuit carrier 100 of the present embodiment, through the structural design of the first layout patterns 211b (e.g., the protrusions 2111b) in the capacitive electrode layer 2b, the metal pads 3, the bridges 4, and the conductive pillars 5 can be arranged in the peripheral region 1b for effectively preventing a circuit layout of the circuit carrier 100 and a structural design of the chip 200 from affecting each other.

Moreover, in the present embodiment, each of the first layout patterns 211b is defined as a driving electrode (TX), and each of the second layout patterns 221b is defined as a sensing electrode (RX), but the present disclosure is not limited thereto. For example, in other embodiments of the present disclosure not shown in the drawings, each of the first layout patterns 211b can be a sensing electrode, and each of the second layout patterns 221b can be a driving electrode.

Third Embodiment

Figure 6:
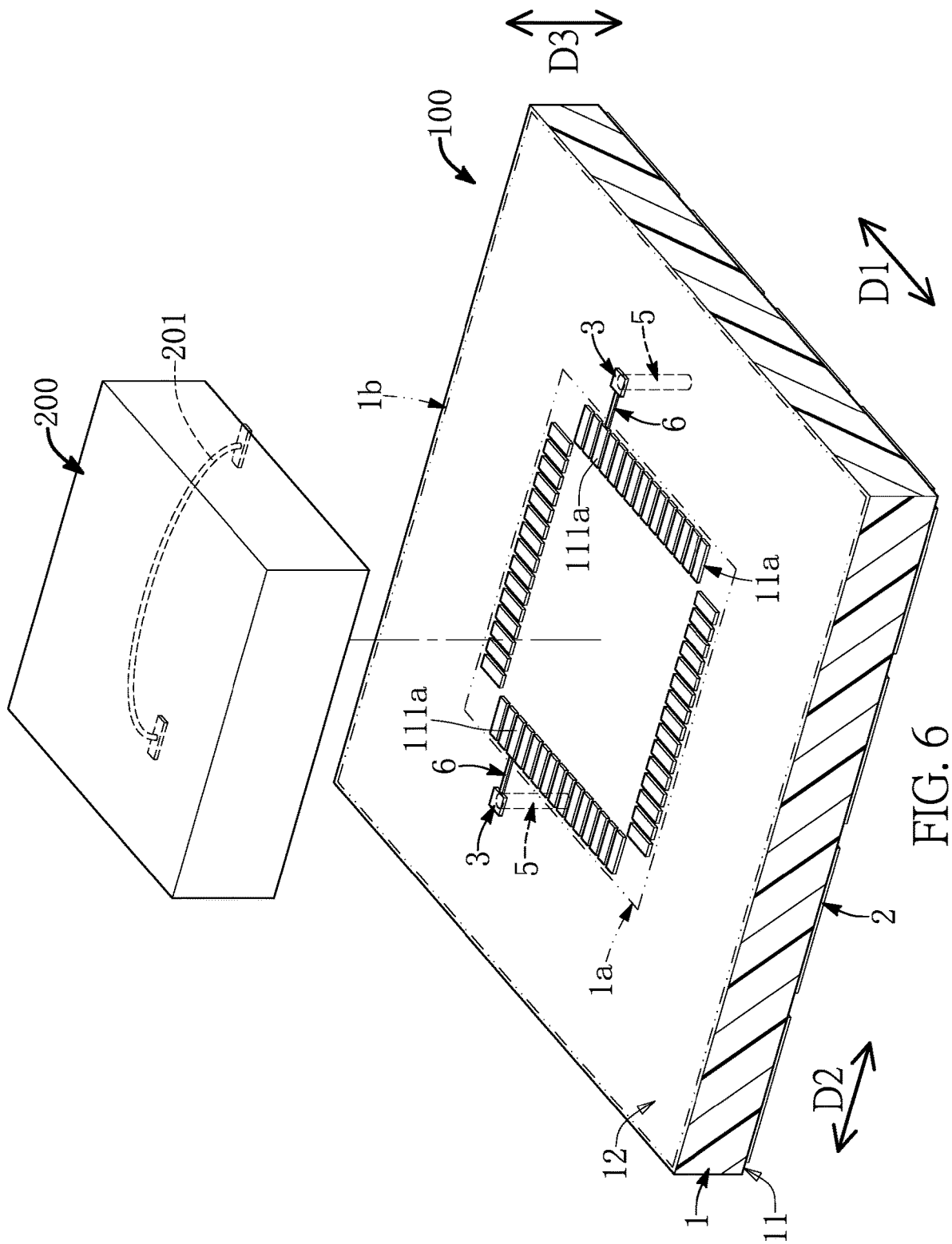
FIG. 6 is a schematic exploded view of the circuit carrier and the chip according to a third embodiment of the present disclosure.
Figure 7:
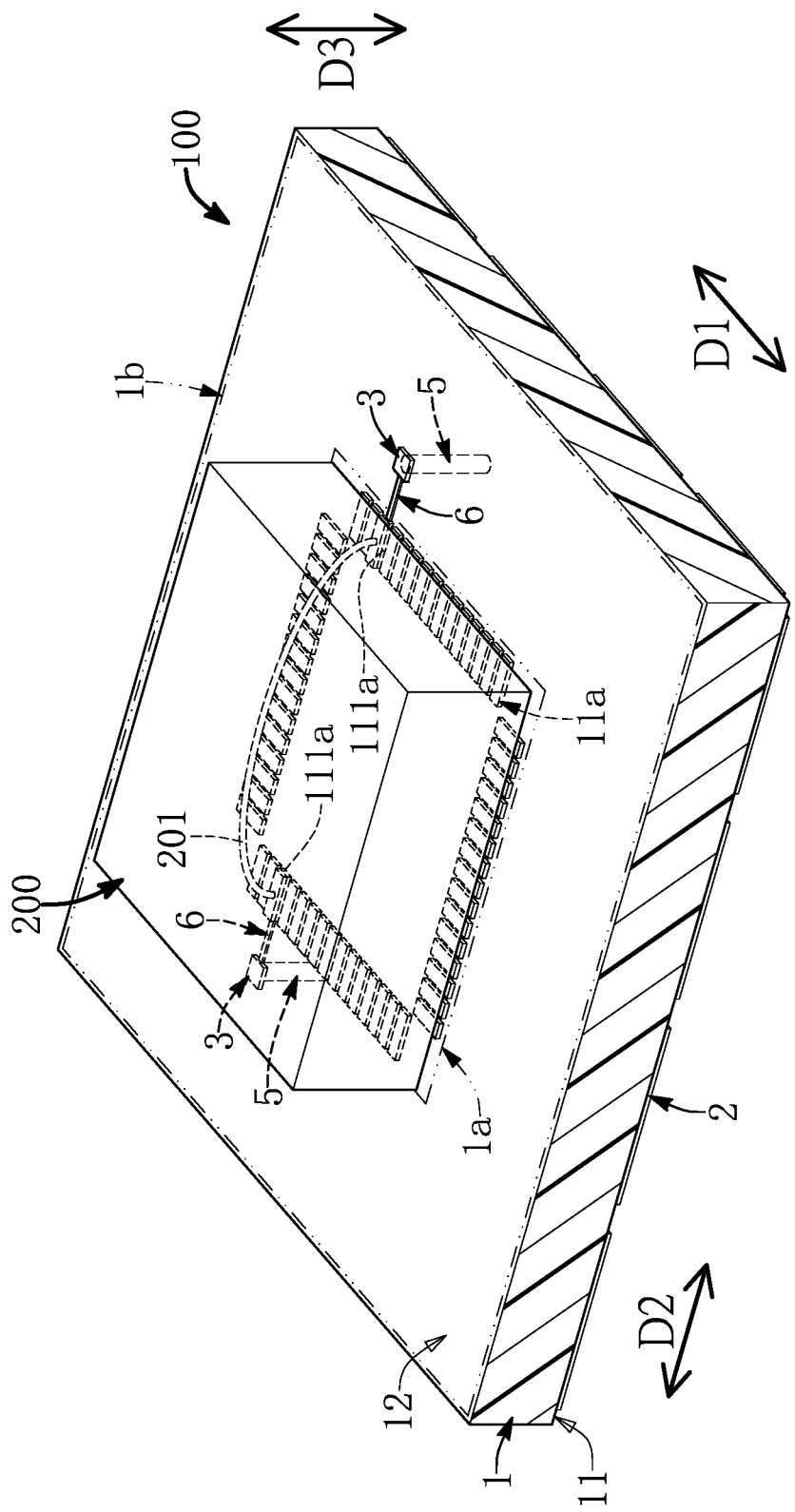
FIG. 7 is a schematic perspective view of FIG. 6 when the chip is mounted on the circuit carrier.
Figure 8:
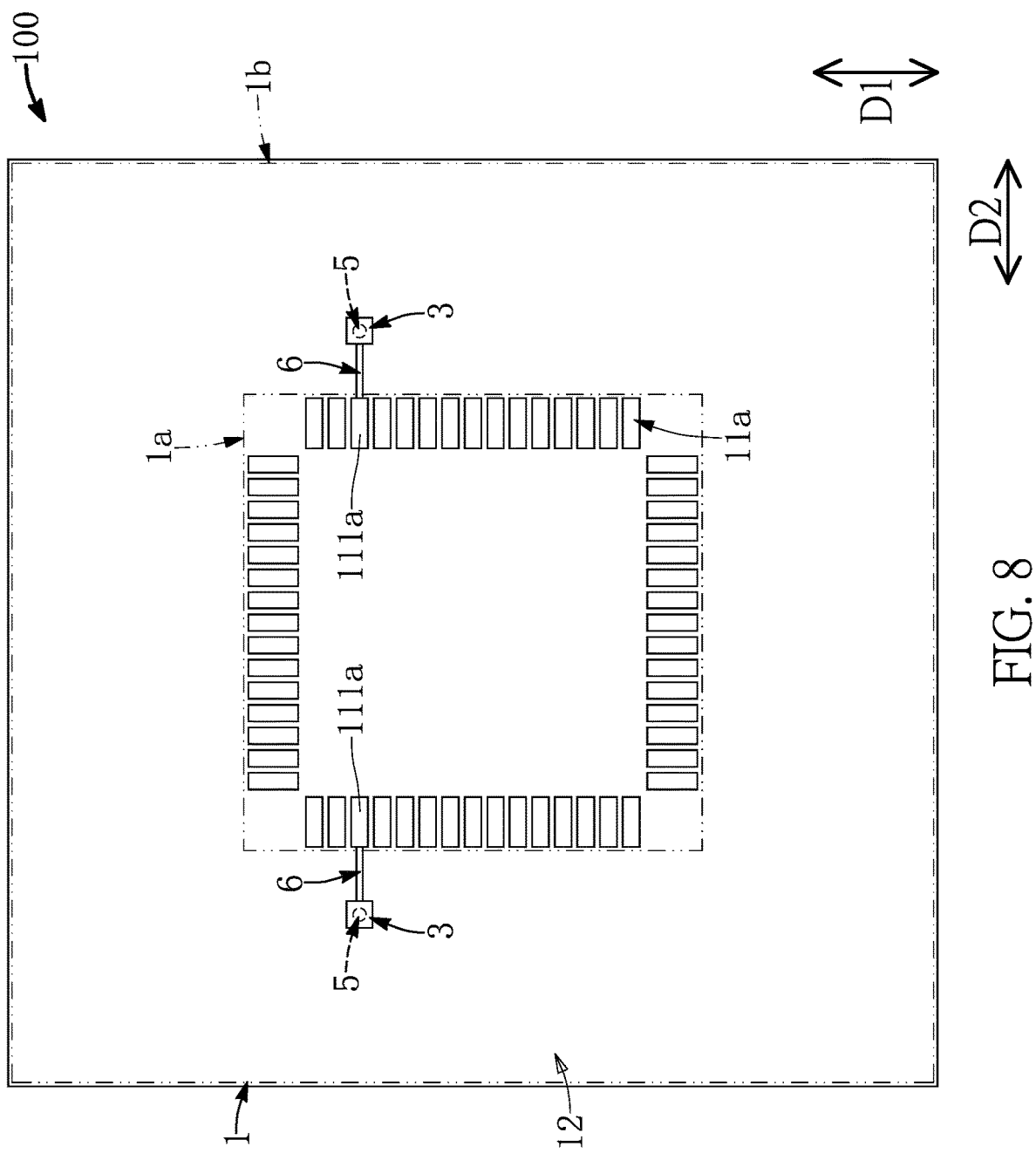
FIG. 8 is a schematic top view of the circuit carrier of FIG. 6.

Referring to FIG. 6 to FIG. 11, a third embodiment of the present disclosure is provided. As shown in FIG. 6 to FIG.

8, the present embodiment provides a circuit carrier 100, which includes a substrate 1, a capacitive electrode layer 2, two metal pads 3, two extending circuits 6, and two conductive pillars 5. The capacitive electrode layer 2 is formed on one side of the substrate 1, the two metal pads 3 and the two extending circuits 6 are formed on another side of the substrate 1, and the two conductive pillars 5 are embedded in the substrate 1. It should be noted that in order to clearly describe the present embodiment, the drawings only show a part of the circuit carrier 100 for ease of discussion.

The substrate 1 in the present embodiment can be a PCB, but the present disclosure is not limited thereto. The substrate 1 has a die-bonding region 1a and a peripheral region 1b that surrounds the die-bonding region 1a, and outer surfaces of the substrate 1 include a layout surface 11 (e.g., a bottom surface of the substrate 1 shown in FIG. 6) and a carrying surface 12 (e.g., a top surface of the substrate 1 shown in FIG. 6) that is opposite to the layout surface 11.

The carrying surface 12 arranged on the die-bonding region 1a of the substrate 1 allows a chip 200 (e.g., a touch-control chip) to be mounted thereon. In other words, the carrying surface 12 of the substrate 1 is provided for the chip 200 to be mounted thereon, and a projection region of the substrate 1 defined by orthogonally projecting the chip 200 toward the layout surface 11 is defined as the die-bonding region 1a.

Specifically, the die-bonding region 1a includes a plurality of connection pads 11a arranged on the carrying surface 12 for allowing the chip 200 to be mounted thereon, so that two of the connection pads 11a are configured to be electrically coupled to each other through an internal circuit 201 of the chip 200 and are each defined as a layout connection pad 111a. It should be noted that the two layout connection pads 111a of the circuit carrier 100 do not have other functions.

The capacitive electrode layer 2 is formed on the layout surface 11, and the capacitive electrode layer 2 in the present embodiment can have any layout according to design requirements. For example, the capacitive electrode layer 2 in the present embodiment can be identical to that of the first or second embodiment, and the present disclosure is not limited thereto.

The two metal pads 3 and the two extending circuits 6 are formed on the carrying surface 12 and are located on the peripheral region 1b, and the two metal pads 3 are respectively connected to the two layout connection pads 111a through the two extending circuits 6. In other words, each of the two metal pads 3 is connected to one of the two layout connection pads 111a adjacent thereto through one of the two extending circuits 6.

Figure 9:
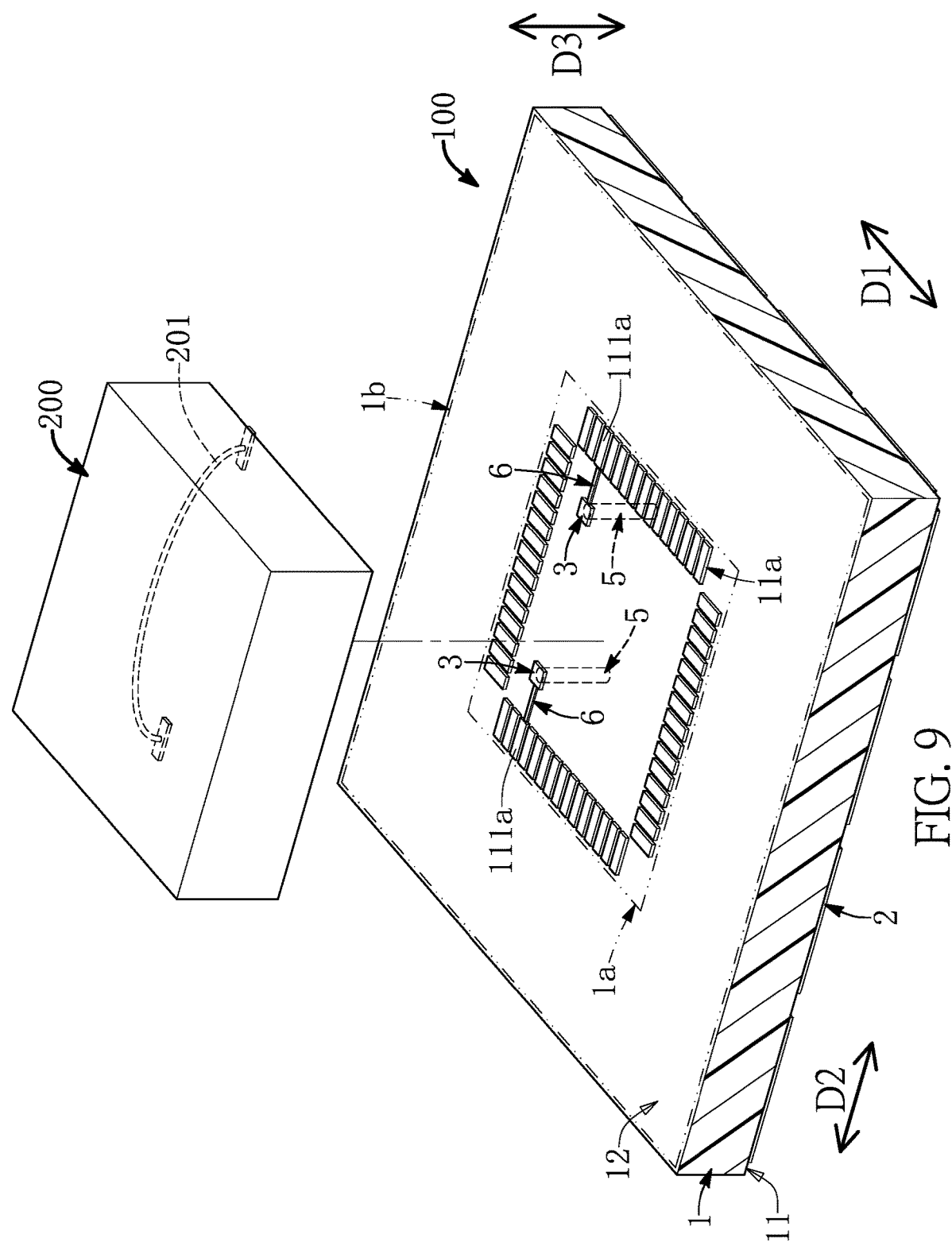
FIG. 9 is a schematic exploded view of the circuit carrier and the chip in another configuration according to the third embodiment of the present disclosure.
Figure 10:
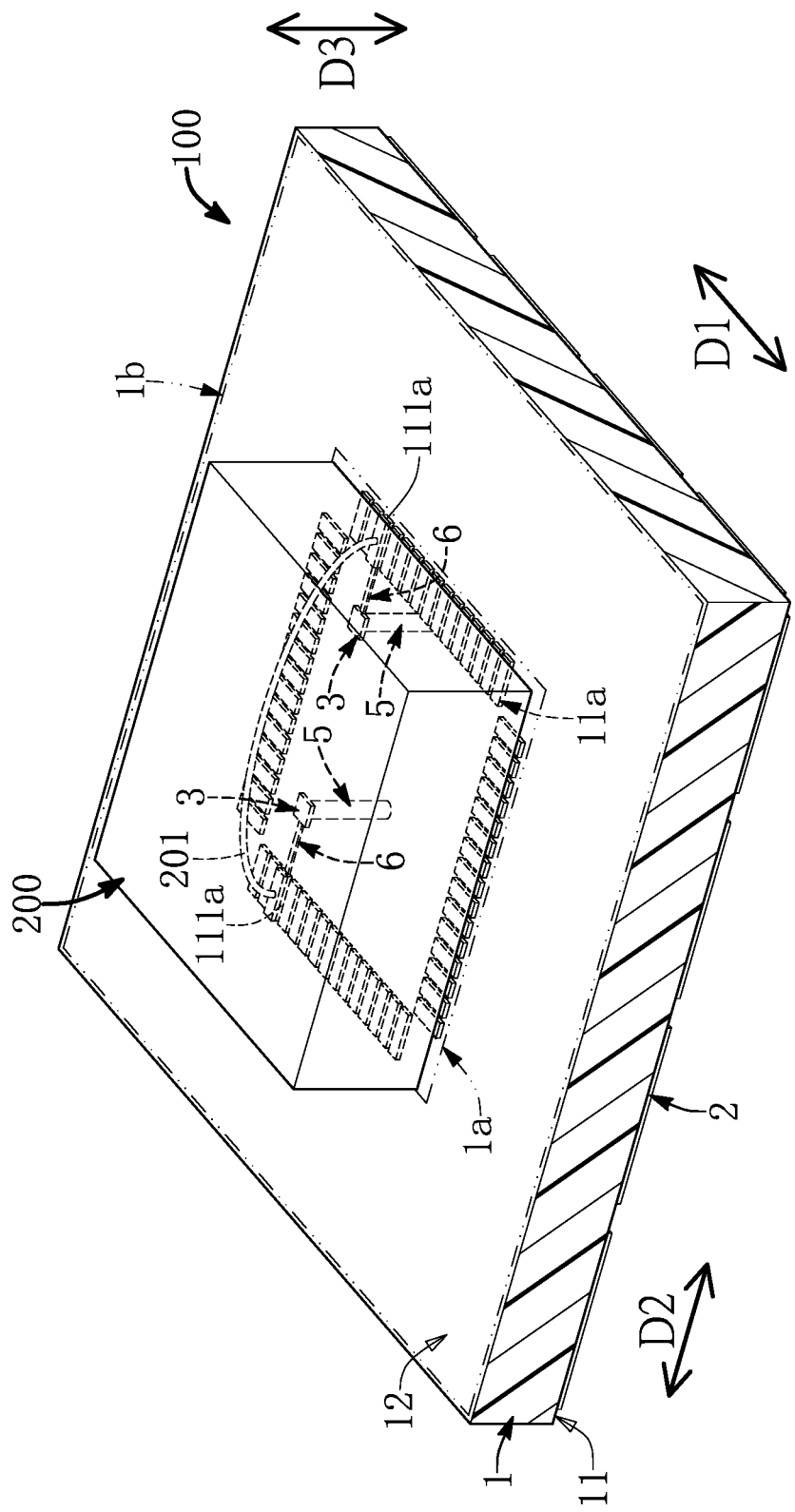
FIG. 10 is a schematic perspective view of FIG. 9 when the chip is mounted on the circuit carrier.
Figure 11:
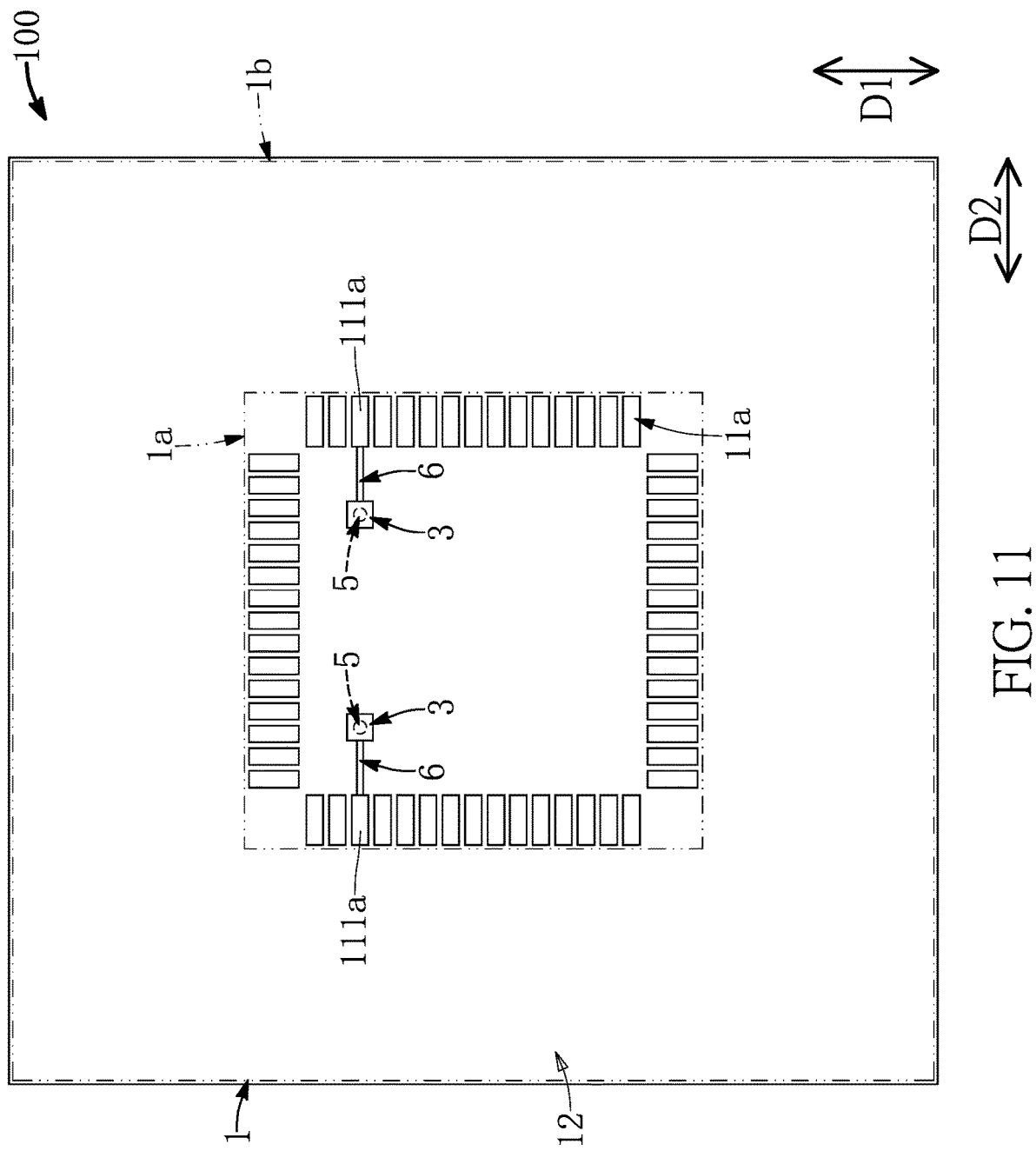
FIG. 11 is a schematic top view of the circuit carrier of FIG. 9.

Moreover, the two conductive pillars 5 are embedded in the peripheral region 1b, and two ends of any one of the conductive pillars 5 are respectively connected to the capacitive electrode layer 2 and one of the two metal pads 3, but the present disclosure is not limited thereto. For example, as shown in FIG. 9 to FIG. 11, the two metal pads 3 and the two extending circuits 6 can be located on the die-bonding region 1a, and the two conductive pillars 5 are embedded in the die-bonding region 1a.

In summary, the circuit carrier 100 of the present embodiment can cooperate with the internal circuit 201 of the chip 200 through the two layout connection pads 111a so as to omit a bridge that connects the two metal pads 3, thereby effectively preventing a circuit layout of the circuit carrier 100 and a structural design of the chip 200 from affecting each other.

Beneficial Effects of the Embodiments

In conclusion, in the circuit carrier of the present disclosure, through the structural design of the capacitive electrode layer (e.g., the structural cooperation of the M number of the first layout electrodes and the N number of the second layout electrodes; or, the structural design of the first layout patterns), the metal pads, the bridges, and the conductive pillars can be arranged in the peripheral region for effectively preventing a circuit layout of the circuit carrier and a structural design of the chip from affecting each other.

Moreover, the circuit carrier provided by the present disclosure can cooperate with the internal circuit of the chip through the two layout connection pads so as to omit the bridge that connects the two metal pads, thereby effectively preventing the circuit layout of the circuit carrier and a structural design of the chip from affecting each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A circuit carrier, comprising:
   a substrate having a die-bonding region and a peripheral region that surrounds the die-bonding region, wherein outer surfaces of the substrate include a layout surface and a carrying surface that is opposite to the layout surface;
   a capacitive electrode layer formed on the layout surface and including:
      a plurality of first electrodes arranged in multiple columns each parallel to a first direction; and
      a plurality of second electrodes arranged in multiple rows each parallel to a second direction, wherein one of the rows does not pass through the die-bonding region and is defined as a first row, and the second electrodes of the first row are connected along the second direction, wherein another one of the rows passes through the die-bonding region and is defined as a second row,
      wherein at least one of the second electrodes of the second row is arranged on the die-bonding region is defined as at least one second layout electrode, and the second electrodes of the second row arranged on the peripheral region have two groups spaced apart from and respectively located at two opposite sides of the at least one second layout electrode along the second direction, and wherein the second electrodes of each of the two groups are connected along the second direction; and
   a conductive structure formed on the peripheral region, wherein the second electrodes of each of the two groups are electrically coupled to the at least one second layout electrode through the conductive structure.

2. The circuit carrier according to claim 1, wherein the first electrodes of one of the columns pass through a space between the at least one second layout electrode and one of the two groups, and the first electrodes of another one of the columns pass through a space between the at least one second layout electrode and another one of the two groups, thereby separating the at least one second layout electrode from the second electrodes of the two groups.

3. The circuit carrier according to claim 1, wherein the first electrodes of two of the columns are respectively arranged at the two opposite sides of the at least one second layout electrode, and are arranged between the second electrodes of the two groups.

4. The circuit carrier according to claim 3, wherein, in any one of the two of the columns, at least two of the first electrodes are connected along the first direction so as to be arranged across the die-bonding region and are each defined as a first layout electrode.

5. The circuit carrier according to claim 4, wherein the at least one second layout electrode is surrounded by four of the first layout electrodes of the two of the columns.

6. The circuit carrier according to claim 1, wherein the first electrodes are spaced apart from each other along the second direction, and the second electrodes are spaced apart from each other along the first direction.

7. The circuit carrier according to claim 1, wherein portions of the at least one second layout electrode protrude from the die-bonding region to respectively form a plurality of extensions disposed on the peripheral region, and wherein the conductive structure includes:
    a plurality of metal pads formed on the carrying surface and disposed on the peripheral region, wherein any one of the extensions of the at least one second layout electrodes corresponds in position to one of the metal pads along a thickness direction that is perpendicular to the first direction and the second direction;
    a plurality of bridges formed on the carrying surface and disposed on the peripheral region, wherein any one of the bridges connects two of the metal pads; and
    a plurality of conductive pillars embedded in the peripheral region, wherein two ends of any one of the conductive pillars are respectively connected to one of the extensions and the corresponding metal pad.

8. The circuit carrier according to claim 1, wherein M number of the first electrodes are connected along the first direction so as to be arranged across the die-bonding region and are each defined as a first layout electrode, where M is a positive integer being greater than one, wherein N number of the second electrodes are separate from each other along the second direction by the M number of the first layout electrodes and are each defined as the second layout electrode, where N is a positive integer being greater than one, wherein a portion of each of the second layout electrodes protrudes from the die-bonding region to form at least one extension disposed on the peripheral region, and wherein the conductive structure includes:
    a plurality of metal pads formed on the carrying surface and disposed on the peripheral region, wherein any one of the extensions of the N number of the second layout electrodes corresponds in position to one of the metal pads along a thickness direction that is perpendicular to the first direction and the second direction;
    a plurality of bridges formed on the carrying surface and disposed on the peripheral region, wherein any one of the bridges connects two of the metal pads; and
    a plurality of conductive pillars embedded in the peripheral region, wherein two ends of any one of the conductive pillars are respectively connected to one of the extensions and the corresponding metal pad.

9. The circuit carrier according to claim 8, wherein the N number of the second layout electrodes have at least two different shapes through formation of the extensions.

10. The circuit carrier according to claim 8, wherein any one of the extensions of the N number of the second layout electrodes is arranged adjacent to one of the first electrodes that has a slot facing toward the corresponding extension adjacent thereto.

11. The circuit carrier according to claim 10, wherein one of the two ends of any one of the conductive pillars connected to a corresponding one of the extensions is surrounded by one of the slots.

12. The circuit carrier according to claim 10, wherein any one of the slots is formed in one of the first layout electrodes, and the M number of the first layout electrodes have at least two different shapes through formation of the slots.

13. The circuit carrier according to claim 8, wherein the first electrodes are spaced apart from each other along the second direction, and the second electrodes are spaced apart from each other along the first direction.

14. The circuit carrier according to claim 8, wherein any one of the first electrodes other than the M number of the first layout electrodes has a shape different from that of each of the first layout electrodes, and wherein any one of the second electrodes other than the N number of the second layout electrodes has a shape different from that of each of the second layout electrodes.

15. The circuit carrier according to claim 8, wherein each of the first electrodes is defined as a driving electrode (TX), and each of the second electrodes is defined as a sensing electrode (RX).

* * * * *